United States Patent [19]
Bell et al.

[11] Patent Number: 6,073,436
[45] Date of Patent: Jun. 13, 2000

[54] FUEL INJECTOR WITH PURGE PASSAGE

[75] Inventors: Lance P. Bell; Kevin M. Munro, both of Bristol, United Kingdom

[73] Assignee: Rolls-Royce plc, London, United Kingdom

[21] Appl. No.: 09/065,514

[22] Filed: Apr. 24, 1998

[30] Foreign Application Priority Data

Apr. 30, 1997 [GB] United Kingdom .................... 9708662

[51] Int. Cl.[7] ...................................................... F02C 7/22
[52] U.S. Cl. .......................................... 60/39.094; 60/742
[58] Field of Search ................................ 60/39.094, 740, 60/741, 742

[56] References Cited

U.S. PATENT DOCUMENTS

| | | |
|---|---|---|
| 4,305,255 | 12/1981 | Davies et al. . |
| 4,342,198 | 8/1982 | Willis .......................................... 60/742 |
| 4,425,755 | 1/1984 | Hughes ...................................... 60/742 |
| 4,938,418 | 7/1990 | Halvorsen . |
| 5,199,265 | 4/1993 | Borkowicz . |
| 5,243,816 | 9/1993 | Huddas ................................. 60/39.094 |
| 5,417,054 | 5/1995 | Lee et al. . |

FOREIGN PATENT DOCUMENTS 2 096 304  10/1982  United Kingdom .

*Primary Examiner*—Louis J. Casaregola
*Attorney, Agent, or Firm*—Oliff & Berridge, PLC

[57] ABSTRACT

A gas turbine fuel injector has a fuel mixing barrel, including an air swirler incorporating a fuel flow outlet, suspended in the combustor air stream by a cantilevered injector body. The cantilevered body is mounted in the combustor wall and includes a fuel flow control valve in a valve chamber located in a part of the body in a relatively cool air surrounding the combustor. The fuel outlet is located towards the downstream end of the swirler barrel. A purge passage is provided from a location towards the upstream end of the barrel extending into the outlet side of the valve chamber. When fuel flow is shut-off a pressure differential between the upstream and downstream ends of the swirler barrel causes an air flow up the purge passage into the valve chamber and down the main fuel passage to purge residual fuel.

16 Claims, 2 Drawing Sheets

FUEL INJECTOR WITH PURGE PASSAGE

BACKGROUND OF THE INVENTION

1. Field of the Invention

This invention relates to gas turbine engine. More particularly but not exclusively this invention relates to a fuel injector for the combustor of a gas turbine engine.

2. Description of the Related Art

It is known in the field of gas turbine combustion to provide staged fuel systems where particular fuel injectors are used for specific engine conditions, for example low power for low speed or high power for high speed. One problem associated with the intermittent use of particular fuel injectors is that when not in use the injector can become prone to fuel carbonization in its fuel passages. This is caused by fuel remaining in the passages of the injector during its non use being heated by the combustion process such that this fuel becomes 'coked' over time. Such deposits adversely affect the performance of the engine since the fuel flowing through an affected injector will be inhibited.

Prior art proposals which attempt to overcome this problem include the provision of a fuel purge system which utilises a pressure difference in an injector by providing two interconnecting fuel passages through which fuel may be purged when required.

In particular a number of prior art proposals disclose a purging fuel passage which is sealed during normal use of the injector. This is usually achieved by use of a valve which is opened when purging is required. However it is a problem with this arrangement that the seal will leak to some extent and hence the purge fuel passage itself may be subjected to carbon build up and hence carbonisation.

Another proposal is described in U.S. Pat. No. 5,417,054. The injector described in this patent includes two fuel passages and two air passages. Under normal fuel delivery pressure both the fuel passages issue fuel, however when the fuel is shut off the inner of the two fuel passage outlets experiences a higher pressure than the outer one. Hence fuel within the passages is purged away from the higher pressure fuel exit within the nozzle.

In all the aforementioned prior art proposals the available driving pressure, essential for providing the required fuel purge, is derived downstream of swirl vanes. It is a feature of fuel injectors that a large proportion of the inlet to outlet air pressure drop is taken across the swirl vanes. Thus the pressure differential remaining for the purge process may not be enough to complete the purge operation.

It is an object of the present invention to provide an improved injector arrangement and/or to provide improvements generally.

SUMMARY OF THE INVENTION

According to the invention there is provided a fuel injector for a gas turbine engine comprising an injector body, first fuel duct means for injecting fuel into a combustion chamber and second fuel duct means mounted at least partially within said first fuel duct means, said second fuel duct means comprising an inlet and an outlet wherein said outlet is positioned in the upstream end of said injector body.

Advantageously, due to the positioning of a second fuel duct outlet at the upstream end of the injector body the differential air pressure between the upstream and downstream ends of the injector body forces fuel up the second fuel duct, into the first fuel duct and then into the combustor.

The invention will now be described with reference to the accompanying drawings in which:

FIG. 1 is a schematic form of a gas turbine engine partly in section and including a combustion chamber.

FIG. 2 is a section view of a fuel injector in accordance with one embodiment of the present invention, FIG. 3 is a section view of a fuel injector in accordance with am of the present invention.

FIG. 4 is another section view of a fuel injection accordance with another embodiment of the present invention.

Figure 1:
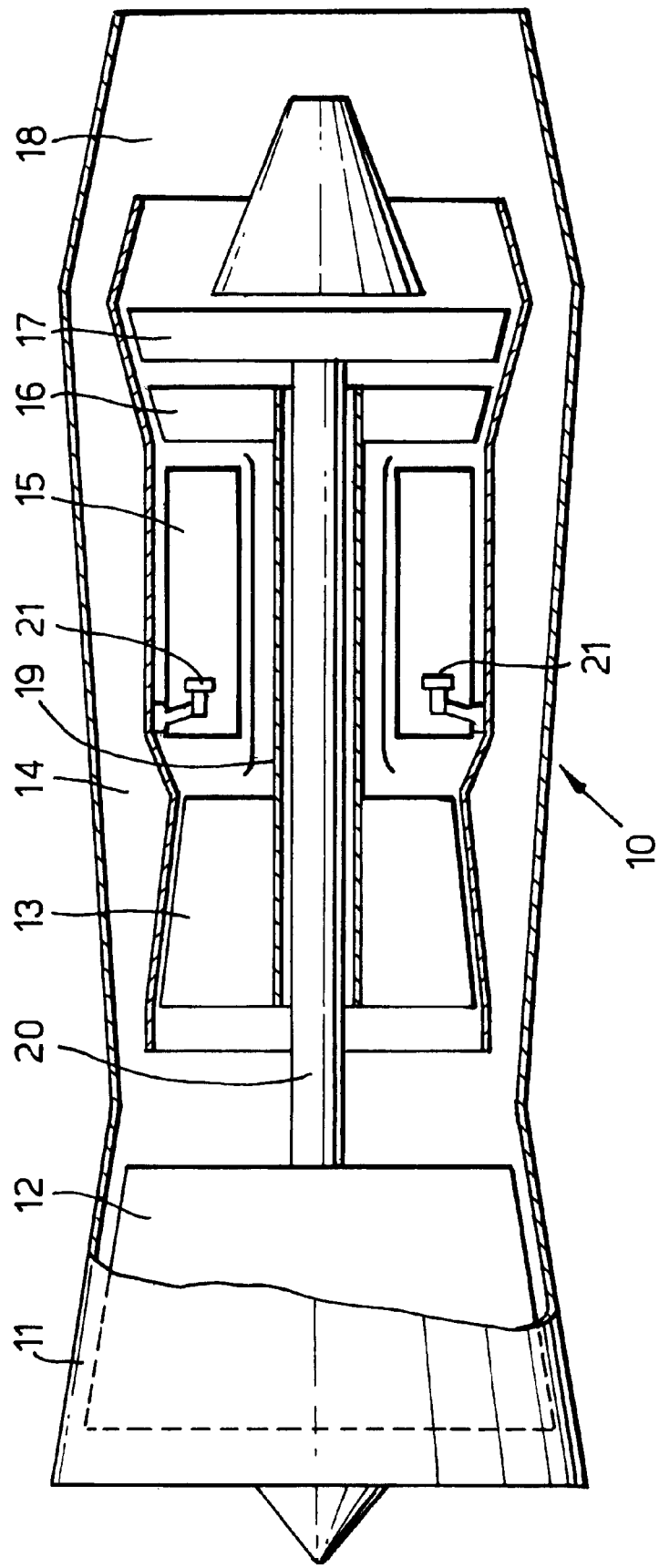
As shown in FIG. 1 a prior art gas turbine engine 10 includes low and high pressure compressors indicated generally at 12 and 13, a combustion chamber, a bypass duct 14, a combustion system 15, a high pressure turbine 16, a low pressure turbine 17, a nozzle 18 and shafts 19 and 20.

In operation air enters the gas turbine 10 through intake 11 and is then initially compressed by the low pressure compressor 12. The air flow then splits into two portions, the first passes through the high pressure compressor 13 where the air is further compressed before being injected into the combustion system 15. The air is mixed with fuel in the combustion system 15, before being burnt and the hot gases of combustion expand through the high pressure turbine 16 and the low pressure turbine 17 which drive the high and low pressure compressors 13 and 12 respectively, via shafts 19 and 20 before passing out of the gas turbine 10 through the nozzle 18.

The second portion of air passes along the bypass duct 14 and exits from the gas turbine 10 through nozzle 18.

Figures 2, 3, 4:
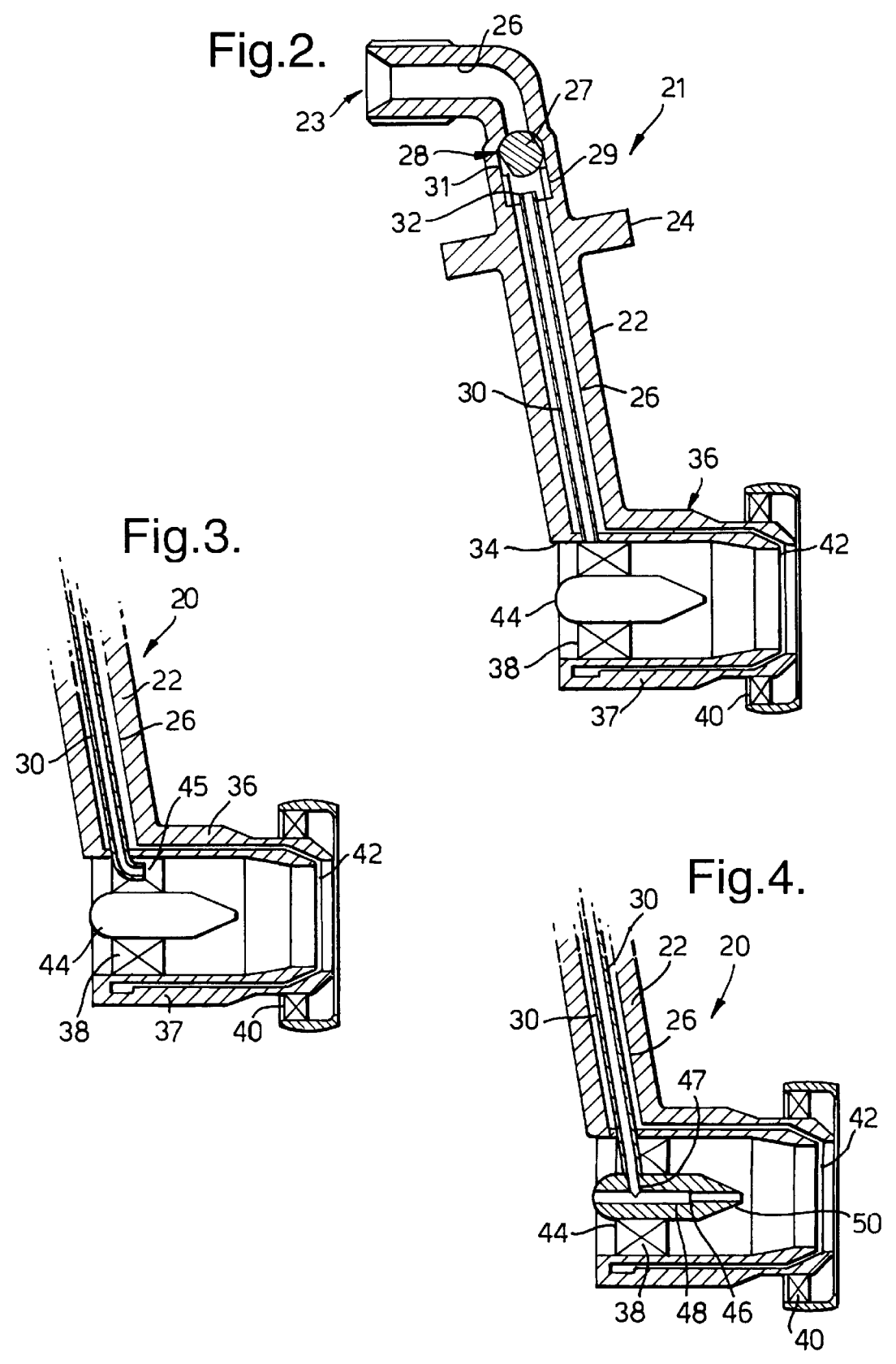

FIG. 2 shows a cross-sectional vies of a fuel injector 21. The injector 21 includes a tubular body 22. The tubular body 22 is provided with a flange portion 24 for mounting the injector on the engine housing whereby the cantilevered part of the body 22 projects into the combustion system 15. A fuel passage 26 extends though the tubular body 22 from fuel inlet 23. A non-return valve 28 is positioned in valve chamber 31 in the head of the tubular body 22 for metering the flow of fuel. A valve member 27 is biased by spring 29 against a valve seat formed in the injector body 22 to shut-off the fuel inlet in the absence of pressure in the fuel system (not shown). When pressure is generated in the fuel system the member 27 is forced off its seat against the bias force and fuel is free to flow through the valve chamber 31 into the main fuel passage 26 and into a purge passage 30.

The purge passage 30 comprises a tube located within body 22 and in the illustration is concentric with fuel passage 26. Tubular purge passage 30 is provided with an inlet 32 which opens into the valve chamber of valve 28 and an outlet 34. The inlet 32 is located adjacent the fuel control valve 28 and at a position above flange 24 so that the valve and surrounding part of the fuel injector body resides in relatively cool air outside the wall of the combustion system.

The fuel injector 21 is also provided with a fuel nozzle 36. The nozzle comprises ail swirlers 38 and 40 inside a cylindrical injector barrel 37. Outlet 34 is positioned adjacent one air swirler 38. Fuel passage 26 extends through the body of nozzle 36 and at its downstream end comprises a fuel discharge outlet 42. A centerbody 44 on which swirlers 38 are mounted is located within fuel nozzle 36 concentrically with the barrel 37. The centerbody is preferably profiled to increase the local air pressure in the general area of the outlet 34 of purge passage 30. In the embodiment of FIG. 2 the end 34 of the tube forming the purge passage 30 terminates substantially flush with the interior wall of the injector barrel 37. Thus the air pressure available at the purge orifice 34 is determined by the static pressure head at that position in the barrel and is In use, when the fuel system is pressurised the valve 28 opens automatically to pass fuel directly through fuel passage 26. In known manner the fuel is atomized by air swirlers 38, 40 upon its discharge into the combustor chamber. A small portion of the fuel (about 5%) also passes through purge inlet 32 into passage 30 and exits through the restrictor into the upstream end of fuel nozzle 36. Thus, the purge passage is continually fed with fuel which acts to keep the purge passage 30 cool in order to avoid carbon build-up and subsequent blockage of the purge tube. To maintain this cooling fuel flow it is essential that the purge tube is not shut-off by the action of the valve 28, or any other valve means. Shut-off valves in hot regions are inevitably prone to leakage and leakage flow rates easily lead to carbon build-up which is avoided by this arrangement.

In the event that fuel supply to the injector 21 is interrupted or stopped by a staged burner control system, fuel pressure acting on the valve member 27 keeping it open rapidly and effectively reduces to zero and the valve closes. The valve chamber 31 is now cut-off from the fuel inlet 23 but the remainder of the fuel passage 26 downstream of the valve 28 remain in open communication with the purge passage 30 through the chamber. In the absence of fuel pressure, differential air pressure between the purge outlet 34 and the fuel discharge outlet 42, that is between the upstream and downstream ends of the nozzle barrel 36 causes a reverse flow in passage 30 from the outlet 34 up the interior of the injector body 22 into the valve chamber 31 and thence into the main fuel passage 26. Once residual fuel has been driven out of the passage-through the discharge outlet 42 the air pressure differential maintains a continual flow of air. When fuel pressure is restored the valve 28 opens once more admitting fuel into chamber 31. This cuts-off the flow of air and the significantly greater fuel pressure restores normal fuel flow in the passages 26, 30.

FIGS. 3 and 4 disclose further embodiments of injector 21 which incorporate different positions for the purge passage outlet. Much of these two alternative arrangements is identical with the arrangement of FIG. 2 described above, accordingly like parts carry like references. In fact these further figures show only the parts of the fuel injector containing changes.

Referring now to FIG. 3 the tube 30 constituting the purge passage has a terminal end 45 which extends into the air passage through the swirler 38 and is bent to face downstream, that is to the right in the illustration. The effect of this is the same as the flush purge orifice of FIG. 2, that is to utilise the static pressure head of the air flow through the swirler while avoiding the ram effect of the moving air itself. In both instances the profile of the centerbody 44 may be chosen to increase local pressure in the vicinity of the end of the purge tube 30 in order to maximize the available pressure differential to drive the purge flow.

In the third arrangement shown in FIG. 4 the centerbody 44 is provided with an axial passage 46 and the purge tube 30 projects into the interior of the centerbody 44 to intersect at 47 with the passage 46. The centerbody 44 generally comprises an elongate round body which may be tapered towards its downstream end. Its primary purpose is to act as a support hub for the swirler vanes 38. In this third embodiment the axial passage 46 extends from a point on the centerline of the injector barrel in a, downstream direction. A first part 48 of passage 46 is formed with a first constant diameter (or cross-section) for a distance beyond the intersection 47 with the purge tube 30. Beyond this intersection a second part 50 of the passage has a smaller diameter of the passage, or its cross-section if not circular. This reduction in size is shown as a step change but need not be so. The effect of this change is to maximize the pressure available to drive the purge flow through tube 30 by converting a proportion of the velocity head of the air flow in the passage 46 to static pressure. The ratio of the sizes of the two parts 48, 50 of the passage has an influence on the increase in pressure achieved in this arrangement.

What is claimed is:

1. A fuel injector for a gas turbine engine, comprising:
   an injector body,
   a first fuel duct for injecting fuel into a combustion chamber, and
   a second fuel duct mount ed at least partially within said first fuel duct, said second fuel duct including an inlet and an outlet, wherein said outlet is positioned in the upstream end of an injector barrel of said injector body, and said injector body includes a centerbody profiled so as to increase the pressure in the injector barrel in the vicinity of the second fuel duct outlet.

2. A fuel injector according to claim 1 wherein said injector barrel is provided with an air inlet located at least partly downstream of said second fuel duct outlet.

3. A fuel injector according to claim 1 wherein said injector barrel is provided with an air inlet positioned adjacent said second fuel duct outlet.

4. A fuel injector according to claim 1 wherein said centerbody includes a hollow passage formed therein connected with said second fuel duct.

5. A fuel injector according to claim 4 wherein said hollow passage is a fuel restrictor.

6. A fuel injector according to claim 5 wherein said hollow passage includes an upstream portion and a downstream portion, said upstream portion having a greater cross sectional area than the downstream portion.

7. A fuel injector according to claim 1 wherein said first fuel duct includes flow control means.

8. A fuel injector for a gas turbine engine, comprising:
   an injector body having a cantilevered part carrying a barrel through which, in use, air passes into a combustion region,
   a first fuel passage having a discharge outlet for injecting fuel into the combustion region, and
   a second fuel passage having a first end in open communication with the first fuel passage and a second end opening into an upstream end of the barrel, the arrangement of the barrel being such that in use the discharge outlet of the first fuel passage and the second end of the second fuel passage are in regions having different static air pressures, whereby in the absence of fuel under pressure in the first and second fuel passages differential air pressure between the upstream and downstream ends of the barrel causes a purge airflow through the fuel passages which enters through the second end of the second fuel passage and exits the first fuel passage and the discharge outlet.

9. A fuel injector according to claim 8, wherein the discharge outlet of the first fuel passage is located towards the downstream end of the barrel and the second end of the second fuel passage is located towards the upstream end of the barrel.

10. A fuel injector according to claim 8, wherein the first fuel passage and the second fuel passage are in open communication through a chamber downstream of a fuel cut-off valve.

11. A fuel injector according to claim 8, further comprising a centerbody located within the barrel and profiled so as to increase the pressure in the vicinity of the second end of the second fuel passage.

12. A fuel injector according to claim 11, wherein said centerbody includes air swirlers in the upstream end of the barrel.

13. A fuel injector according to claim 12, wherein the second end of the second fuel passage is formed flush with a wall of the barrel in the vicinity of the air swirlers.

14. A fuel injector according to claim 12, wherein the second end of the second fuel passage is formed with a terminal end which extends into the barrel through the air swirlers and is bent in a downstream direction.

15. A fuel injector according to claim 11, wherein the centerbody is formed with an axial passage therethrough and the second end of the second fuel passage intersects said axial passage.

16. A fuel injector according to claim 11, wherein the centerbody comprises an elongate round body which tapers in a downstream direction and is located on a centerline of the barrel.

* * * * *